United States Patent [19]

Kemp

[11] 3,780,982
[45] Dec. 25, 1973

[54] CONTROL PORTS FOR GATE VALVE STRUCTURE

[75] Inventor: Willard E. Kemp, Houston, Tex.

[73] Assignee: ACF Industries, Inc., New York, N.Y.

[22] Filed: Dec. 8, 1972

[21] Appl. No.: 313,287

[52] U.S. Cl................ 251/210, 138/94, 137/625.33
[51] Int. Cl.............................................. F16k 3/00
[58] Field of Search.................. 137/625 R, 625.28, 137/625.3, 625.33, 625.37; 251/210, 327, 328, 282, 199, 301, 302

[56] References Cited
UNITED STATES PATENTS
| | | | |
|---|---|---|---|
| 2,601,304 | 6/1952 | Lane | 251/199 |
| 2,986,367 | 5/1961 | Le Rouax | 251/327 X |
| 3,424,200 | 1/1969 | Marley et al. | 251/302 |

*Primary Examiner*—Henry T. Klinksiek
*Attorney*—Eugene N. Riddle

[57] ABSTRACT

A gate valve structure having a slab gate with a relatively large diameter main port or bore therethrough and a plurality of relatively small diameter bores adjacent the main bore. Upstream and downstream seating assemblies are positioned on opposed sides of the slab gate. The small diameter control ports or bores have longitudinal axes inclined outwardly with respect to the upstream seating assembly with the inclination being of a magnitude to permit the downstream ends of the small diameter bores to clear the downstream seating assembly before the upstream ends of the bores are in fluid communication with the flowline thereby to minimize the fluid pressure differential upon the initial opening of the main bore.

9 Claims, 11 Drawing Figures

PATENTED DEC 25 1973 3,780,982

CONTROL PORTS FOR GATE VALVE STRUCTURE

BACKGROUND OF THE INVENTION

Heretofore, gate or plug valves have been provided with ports of a small diameter extending through a gate adjacent the main port to provide fluid communication between upstream and downstream sides of the gate before any opening of the main port. For example, U.S. Pat. No. 2,902,054 dated Sept. 1, 1959, shows a throttling plug valve in which a series of small openings adjacent the main part are employed to provide an initial restricted flow upon opening of the valve and to tend to equalize the upstream and downstream pressures. Further, gates have been provided with a plurality of openings having varying diameters with a selected opening being aligned with the inlet and outlet conduits to provide the desired flow. Such arrangements, however, have been for the purpose of throttling the flow of fluid or for pressure equalization between upstream and downstream sides of the valve.

DESCRIPTION OF THE PRESENT INVENTION

The present invention is directed to a gate valve structure having a gate with a main bore of a relatively large diameter adapted to be aligned in the open position with the upstream and downstream flowlines and a series of relatively small bores adjacent the main bore. The small bores are positioned in a staggered relation adjacent the side of the main bore toward the flowline when the gate is in a closed position. Thus, the small diameter bores are exposed to and in communication with fluid pressure within the flowline before the main port is opened. Upstream and downstream seating assemblies are mounted on opposed sides of the gate. The small diameter bores have longitudinal axes inclined outwardly from the upstream side of the gate and having an inclination at least of a magnitude to permit the downstream ends of the small diameter bores to clear the downstream seating assembly before the upstream ends of the small diameter bores are in fluid communication with and exposed to the interior of the flowline. Upon the upstream ends of the small diameter bores being exposed to the fluid pressure the fluid is directed away from the downstream seating assembly thereby to minimize erosion of the downstream seating assembly. The opening of the small diameter bores before the main bore opens also tends to reduce the fluid pressure differential upon the opening of the main bore and the reduction of the pressure differential likewise minimizes wear and wire drawing of the downstream seating assembly.

In the accompanying drawings, in which two of various possible embodiments of the invention are illustrated, FIG. 1 is a longitudinal section view of a gate valve structure of one embodiment of the present invention, the upper portion being shown in elevation;

Figure 1:
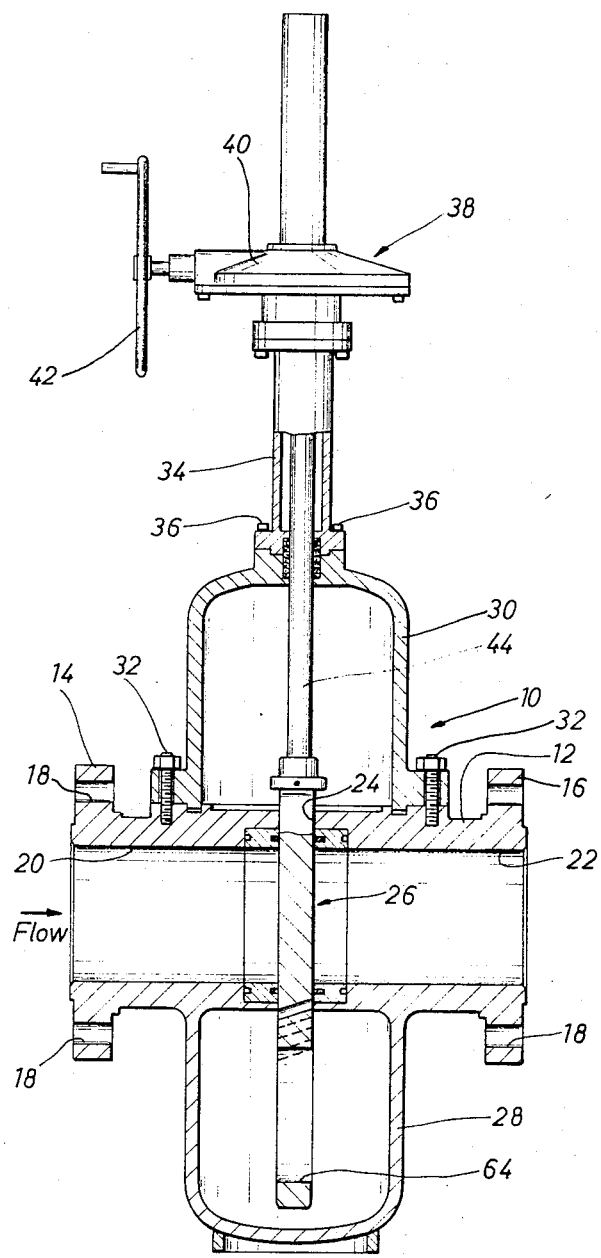
Figure 2:
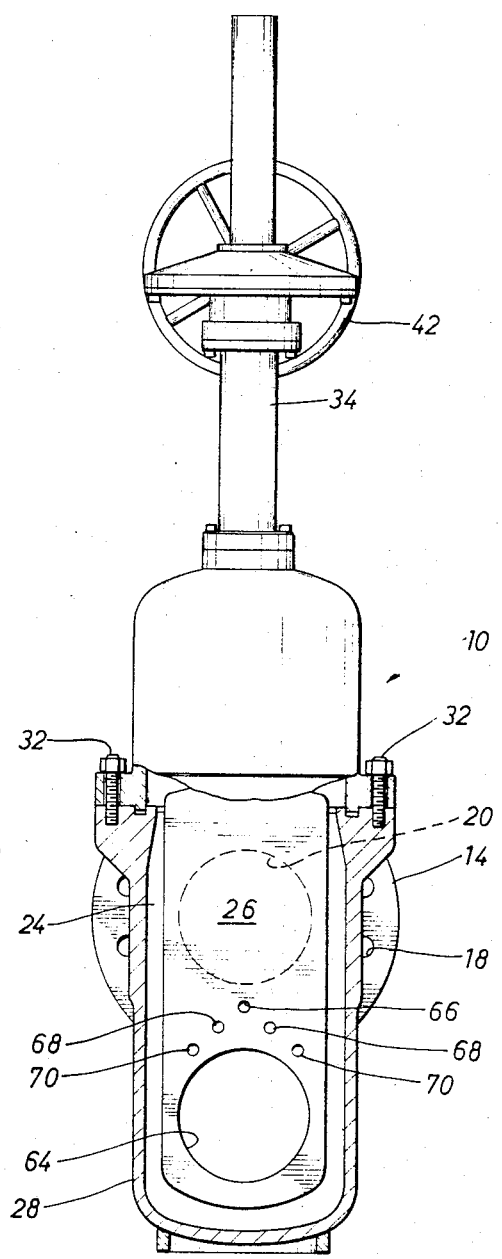
FIG. 2 is a partial cross-sectional view of the gate valve structure shown in FIG. 1.

Referring now to the drawings for a better understanding of the invention, and more particularly to the embodiment shown in FIGS. 1–6, the gate valve structure is generally indicated 10 having a main body 12 with flanges 14 and 16 adjacent opposed ends of body 12. Openings 18 in flanges 14 and 16 permit body 12 to be connected to suitable pipe sections (not shown). An inlet or upstream flowline or flow passage 20 is provided adjacent one side of body 12 and an outlet or downstream flowline 22 is provided adjacent the opposite end of main body 12. A cavity 24 on one side of main body 12 intersects flowlines 20 and 22 and a gate generally indicated 26 is mounted within cavity 24. A lower housing 28 is connected to main body 12 and an upper bonnet 30 has a lower flange bolted at 32 to main body 12. A yoke tube 34 has a lower flange bolted at 36 to upper bonnet 30. A gear operator generally indicated 38 is mounted on tube 34 and has a housing 40 for suitable gear mechanism (not shown). A handwheel 42 may be rotated for actuating the gear mechanism. A gate stem 44 has its lower end connected to gate 26 and has its upper end threaded and attached to the gear mechanism within housing 40 as is well known in the art.

Referring now more specifically to FIGS. 3–6, annular recesses in main body 12 adjacent cavity 24 form annular shoulders 48 and annular circumferential outer surfaces 50. Mounted in the recesses adjacent shoulders 48 and circumferential surfaces 50 are an upstream seating assembly generlly indicated 52 and a downstream seating assembly generally indicated 54. Each seating assembly 52 and 54 is identical and includes a main body 56 having a central bore 58 in alignment with flow passages 20 and 22. Seating assemblies 52 and 54 each have an annular groove in a sealing face 59 which receives a sealing member 60 adapted to engage in sealing relation the adjacent surface of gate 26. An annular groove 61 on the back face of each sealing assembly 52, 54 receives an O-ring 62. O-ring 62 is of a diameter greater than the depth of annular groove 61 and the back face of seating assemblies 52 and 54 is spaced from the adjacent shoulders 48. Thus, O-rings 62 act as springs and urge seating assemblies 52 and 54 into sealing engagement with gate 26.

Figure 3:
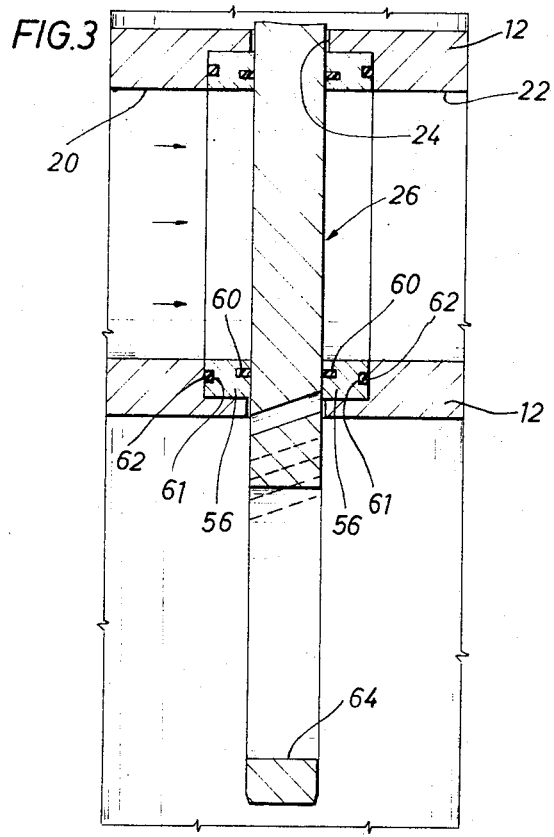
FIG. 3 is an enlarged fragment of FIG. 1 illustrating the gate in a closed position.
Figure 4:
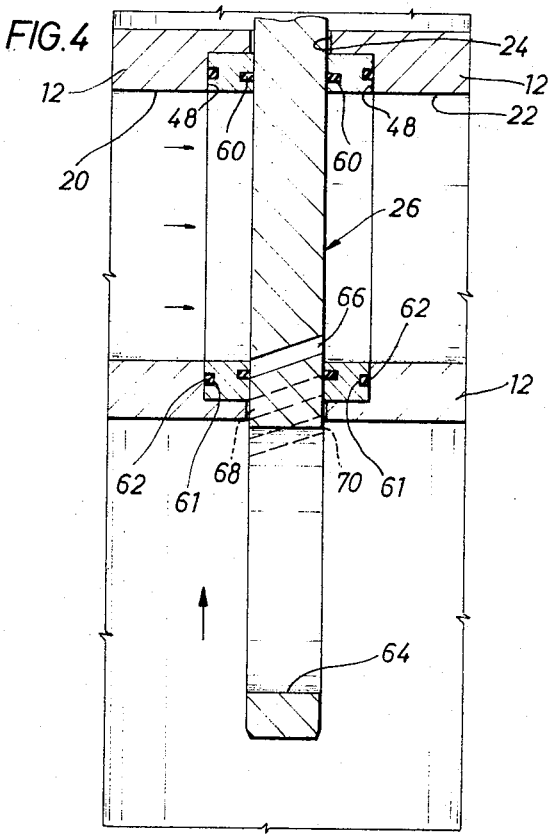
FIG. 4 is an enlarged section similar to FIG. 3 but showing the gate in the position in which the downstream end of a small diameter bore is spaced from the downstream seat and its upstream end is covered by the upstream seat.
Figure 5:
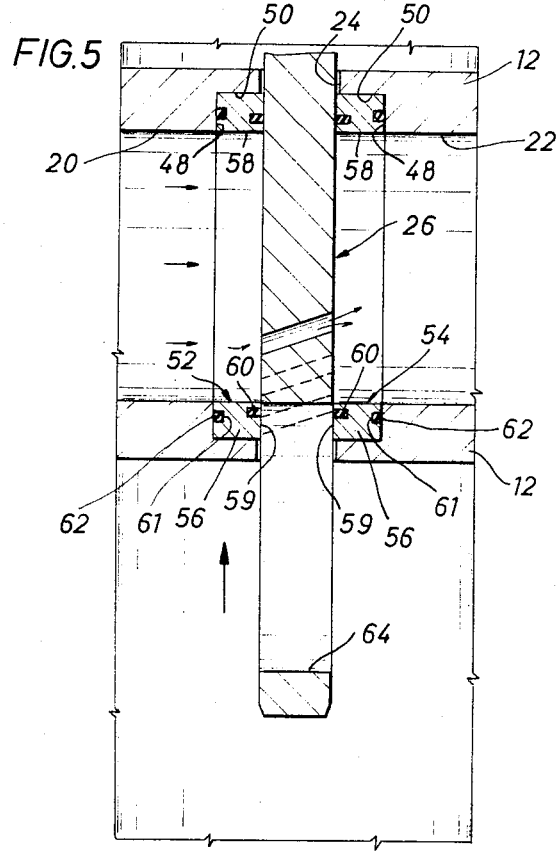
FIG. 5 is an enlarged section similar to FIG. 4 but showing the gate with the upstream ends of the small diameter bores exposed to fluid pressure within the upstream flowline immediately before the main bore is opened.
Figure 6:
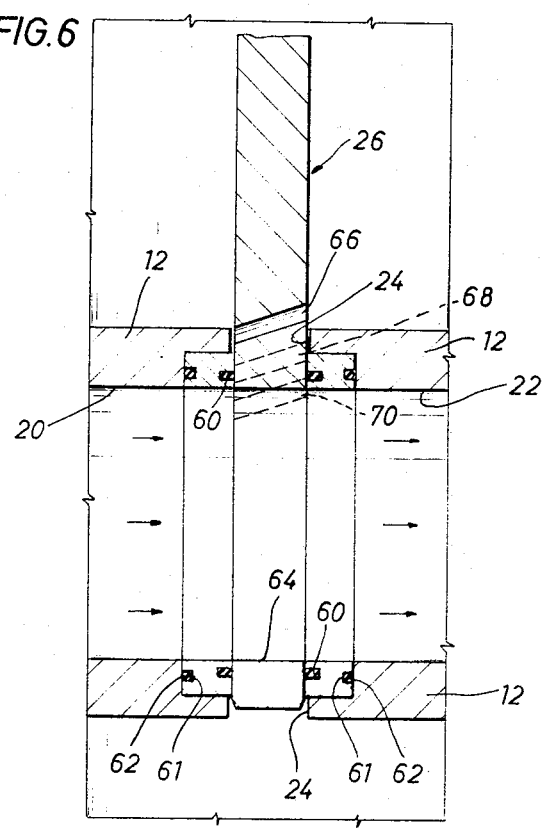
FIG. 6 is a section similar to FIG. 5 but showing the gate in a fully opened position with the main bore in alignment with the flowline.

Gate 26 forms an important part of the present invention and includes a main bore 64 adapted to be aligned with flow passages 20 and 22 in the full open position thereof as shown in FIG. 6. Main bore 64 is formed in the lower portion of the slab forming gate 26 and a series of relatively small diameter bores are arranged in staggered relation with respect to main bore 64 on the side of bore 64 adjacent flow passages 20, 22 when gate 26 is in closed position as shown in FIG. 3. The series of small diameter bores includes an upper bore 66 arranged centrally of the width of slab gate 26, a pair of spaced intermediate bores 68 arranged in a staggered relation below central bore 66, and a pair of spaced lower bores 70 arranged in staggered relation below bores 66 and 68.

As shown, each small diameter bore 66, 68, 70 has a longitudinal axis inclined outwardly with respect to the direction of flow of fluid through passageways 20 and 22 thereby to direct the fluid toward the center of passageways 20 and 22 upon an initial opening of gate 26. Each bore 66, 68, 70 has an upstream inlet end on the side of gate 26 adjacent seating assembly 52 and a downstream outlet end on the side of gate 26 adjacent seating assembly 54. The inclination of small diameter bores 66, 68, 70 is of a magnitude at least sufficient to permit the downstream ends to be fully exposed to the interior of passageway 22 and to be at least slightly spaced from the adjacent circumferential surface of downstream seating assembly 54 before the upstream ends of bores 66, 68 and 70 clear upstream seating assembly 52 and are exposed to fluid pressure within upstream flow passage 20. Therefore, when the upstream ends of bores 66, 68, 70 are exposed to fluid within upstream flow passage 20, the fluid is directed away from downstream seating assembly 54 toward the center of downstream fluid passage 22 thereby to minimize erosion of downstream seating assembly 54.

The upstream ends of lower bores 70 are arranged at location generally in transverse alignment with or slightly above the upper circumferential surface defining main bore 64. As gate 26 moves toward open position from the closed position of FIG. 3, bore 66 first clears downstream seating assembly 52, then bores 68, and next bores 70 clear seating assembly 52. Fluid from upstream fluid passage 20 is directed by bores 66, 68 and 70 toward the center of downstream fluid passage 22 away from downstream seat assembly 54. Main bore 64 initially opens upon or immediately after openings of small diameter bores 70. The communication of fluid in upstream flow passage 20 to downstream flow passage 22 before opening of main bore 64 reduces the pressure differential between the upstream and downstream flow passages and thereby tends to minimize wear of downstream seating assembly 54 upon opening of main bore 64. Further, upstream seal 60 may tend to be forced out of its groove in sealing face 59 by fluid pressure, and the reduction of fluid pressure adjacent the upstream side of gate 26 by opening of bores 66, 68 and 70 minimizes the "blowout" of upstream seal 60 or nipping of seal 60 by gate 26 upon opening and closing of gate 26. As an example, a gate 26 having a thickness of 2 inches may be provided with openings 66, 68 and 70 of ⅜ inch in diameter at an inclination of 18° with respect to the longitudinal axis of the flowline.

Figure 7:
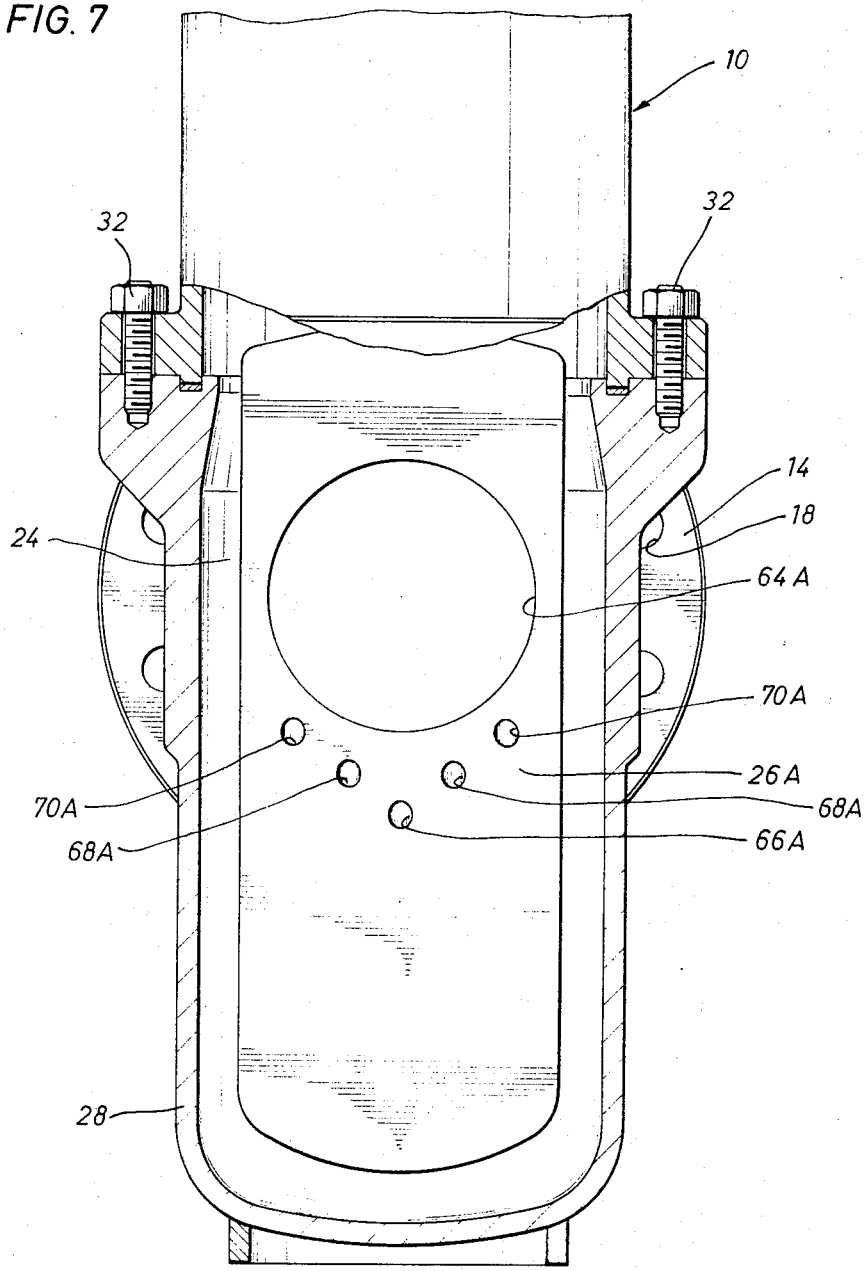
FIG. 7 is a section of another embodimenu of the invention in which a reverse port is formed in the upper portion of the gate.
Figure 8:
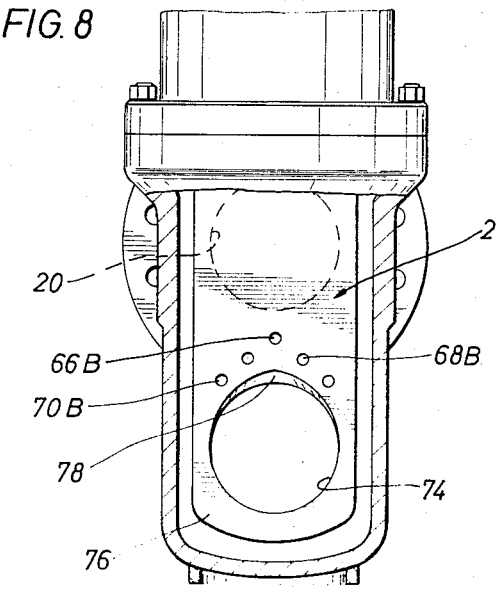
FIG. 8 is an elevation of another embodiment of the invention in which the main bore in the gate is tapered.
Figure 10:
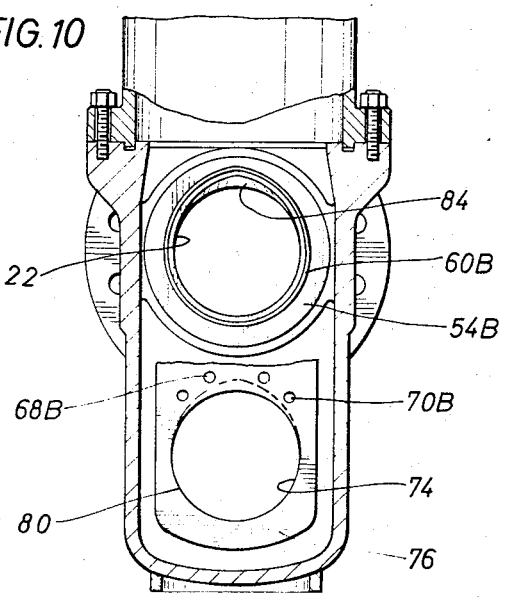
FIG. 10 is an elevation similar to FIG. 8 but showing the gate in fully open position.
Figure 9:
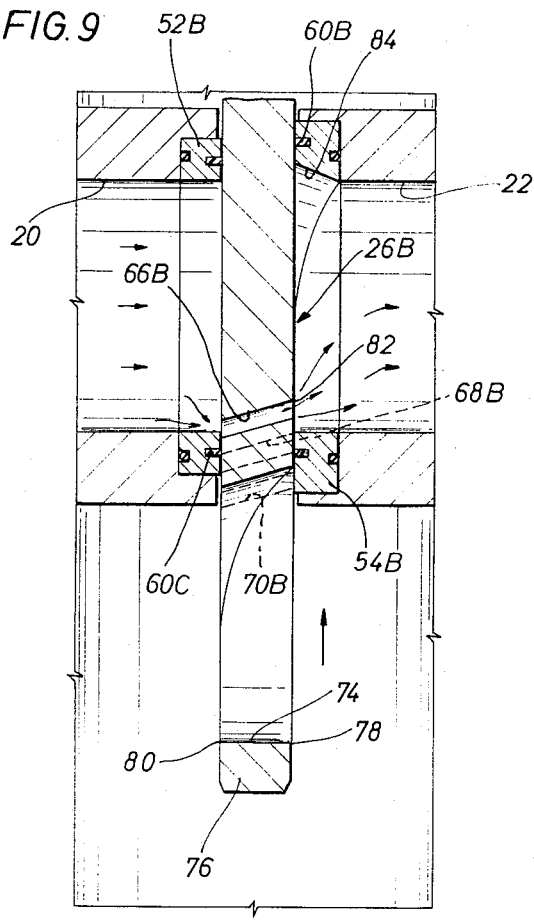
FIG. 9 is a section of the embodiment of FIG. 8 immediately after the initial opening of the gate.
Figure 11:
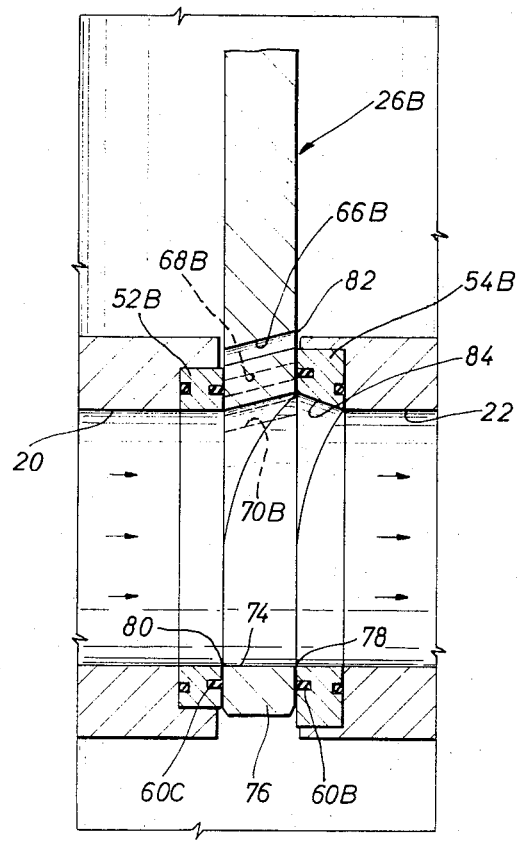
FIG. 11 is a section of the embodiment of FIG. 10 upon movement of the gate to fully open position.

Referring to FIG. 7, a separate embodiment is illustrated in which a "reverse" bore or port 64A is provided in the upper portion of slab gate 26A. A downward movement of gate 26A results in an opening of the main bore 64A. Relatively small diameter bores 66A, 68A and 70A are arranged in a manner similar to the arrangement of bores 66, 68 and 70 of the embodiment shown in FIGS. 1-6 but are positioned adjacent the lower portion of main bore 64A so that upon movement of gate 26A toward open position, small diameter bores 66A, 68A and 70A open before the opening of main bore 64A.

Referring now to FIGS. 8-11, a separate embodiment of the invention is illustrated in which the main port 74 in gate 76 has a downstream edge generally indicated 78 and an upstream edge generally indicated 80. Upstream edge 80 is circular. The leading edge portion 82, relative to movement of gate 76 toward a closed position, of downstream edge 78 is tapered for around 120° of the circumference of downstream edge 78 to permit leading edge portion 82 to clear downstream seat 54B before upstream edge portion 80 clears upstream seat 52B. Thus, initial fluid pressure upon the initial opening of gate 76 is directed away from downstream seat 54B. Downstream seat 54B has a face seal 60B which is offset concentrically outward of face seal 60C in upstream seat 52B. Radial edge surface 84 of downstream seat 54B follows the adjacent contour of bore 74 and is beveled to provide a smooth continuation of the adjacent surface forming flowline 22. Small diameter ports or bores 66B, 68B and 70B may be employed with tapered main bore 74, if desired.

What is claimed is:

1. A gate valve structure comprising a main valve body having a flowline therethrough and a cavity therein intersecting the flowline and opening to a side of the body, a downstream seating assembly on one side of the cavity adjacent the outlet side of the flowline and an upstream seating assembly on an opposed side of the cavity adjacent the inlet side of the flowline, and a gate mounted on said body for movement within the cavity to open and close the flowline, said gate having a main bore therethrough adapted to align with the flowline in the open position thereof and at least one relatively small diameter bore adjacent the main bore, said small diameter bore having a longitudinal axis inclined outwardly from the upstream side of the gate and having an inclination at least of a magnitude to permit the downstream end of the small diameter bore to clear the downstream seating assembly before the upstream end of the small diameter bore is in fluid communication with and exposed to the interior of the flowline whereby fluid pressure from the upstream side of the flowline is directed by the small diameter inclined bore away from the downstream seating assembly.

2. A gate valve structure as set forth in claim 1 wherein a plurality of small diameter bores are arranged on the side of the main bore adjacent the flowline when the gate is in a closed position.

3. A gate valve structure as set forth in claim 1 wherein said main bore is positioned in the lower portion of the gate and said small diameter bore is positioned adjacent the upper side of the main bore.

4. A gate valve structure as set forth in claim 2 wherein said main bore is positioned in the upper portion of the gate and said small diameter bore is positioned adjacent the lower portion of the main bore.

5. A gate valve structure comprising a main valve body having a flowline therethrough and a cavity therein intersecting the flowline and opening to a side of the body, a downstream seating assembly on one side of the cavity adjacent the outlet side of the flowline and an upstream seating assembly on an opposed side of the cavity adjacent the inlet side of the flowline, and a gate mounted on said body for movement within the cavity to open and close the flowline, said seating assemblies each having a central opening therethrough in alighment with the flowline and carrying a sealing element to contact the gate in sealing relation therewith, said gate having a main bore therethrough adapted to align with the flowline in the open position thereof and a plurality of relatively small diameter bores positioned between the main bore and the flowline when the gate is in a closed position, said small diameter bores having longitudinal axes inclined outwardly from the upstream side of the gate and having an inclination at least of a magnitude to permit the downstream ends of the small diameter bores to clear the downstream seating assembly before the upstream ends of the small diameter bores are in fluid communication with and exposed to the interior of the flowline whereby fluid pressure from the upstream side of the flowline is directed by the small diameter inclined bores away from the downstream seating assembly.

6. A gate valve structure as set forth in claim 5 wherein said plurality of relatively small diameter bores are positioned at progressively increasing distances from the main bore.

7. A gate valve structure as set forth in claim 6 wherein said small diameter bores are positioned in laterally staggered relation to each other, and said small diameter bores closest to said main bore are exposed to fluid pressure within the inlet flowline slightly before the initial opening of the main bore. gate 8. A gate valve structure comprising a main valve body having a flowline therethrough and a cavity therein intersecting the flowline and opening to a side of the body, a downstream seating assembly on one side of the cavity adjacent the outlet side of the flowline and an upstream seating assembly on an opposed side of the cavity adjacent the inlet side of the flowline, and a gte mounted on said body for movement within the cavity to open and close the flowline, said gate having a main bore therethrough adapted to align with the flowline in the open position thereof, said main bore having a longitudinal axis inclined outwardly from the upstream side of the gate, the leading edge portion defining the bore upon movement of the gate toward an open position being tapered outwardly from the upstream side of the gate and clearing the downstream seat before a corresponding edge portion on the upstream side of the gate clears the upstream seat.

9. A gate valve structure as set forth in claim 8 wherein a plurality of small diameter bores are arranged on the side of the main bore adjacent the flowline when the gate is in a closed position.

* * * * *